US012454139B2

(12) United States Patent
Kuwabara et al.

(10) Patent No.: US 12,454,139 B2
(45) Date of Patent: Oct. 28, 2025

(54) HEATING APPARATUS, IMAGE FORMING APPARATUS, AND LIQUID DISCHARGE APPARATUS

(71) Applicants: Akitomo Kuwabara, Kanagawa (JP); Noriaki Takenaga, Tokyo (JP); Hiroshi Takaki, Tokyo (JP); Makoto Kobayashi, Kanagawa (JP); Kohji Kuwana, Kanagawa (JP); Junichi Moribe, Kanagawa (JP); Takuto Kido, Kanagawa (JP)

(72) Inventors: Akitomo Kuwabara, Kanagawa (JP); Noriaki Takenaga, Tokyo (JP); Hiroshi Takaki, Tokyo (JP); Makoto Kobayashi, Kanagawa (JP); Kohji Kuwana, Kanagawa (JP); Junichi Moribe, Kanagawa (JP); Takuto Kido, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 259 days.

(21) Appl. No.: 18/238,524

(22) Filed: Aug. 28, 2023

(65) Prior Publication Data

US 2024/0066891 A1 Feb. 29, 2024

(30) Foreign Application Priority Data

Aug. 31, 2022 (JP) ................................ 2022-138083
Jun. 16, 2023 (JP) ................................ 2023-099234

(51) Int. Cl.
*B41J 11/00* (2006.01)
*B41J 29/02* (2006.01)
*B41J 29/377* (2006.01)

(52) U.S. Cl.
CPC ............. *B41J 11/002* (2013.01); *B41J 29/02* (2013.01); *B41J 29/377* (2013.01); *B41J 2203/01* (2020.08)

(58) Field of Classification Search
CPC ........ B41J 11/002; B41J 29/02; B41J 29/377; B41J 2203/01; B41J 11/00242;
(Continued)

(56) References Cited

U.S. PATENT DOCUMENTS

2011/0188883 A1 8/2011 Tokuyama et al.
2013/0328983 A1 12/2013 Thayer et al.
(Continued)

FOREIGN PATENT DOCUMENTS

JP 2011-059359 A 3/2011
JP 2011-158597 A 8/2011
(Continued)

OTHER PUBLICATIONS

Search Report mailed Jan. 18, 2024, in European Application No. 23191646.1, 10 pages.

*Primary Examiner* — Bradley W Thies
(74) *Attorney, Agent, or Firm* — XSENSUS LLP

(57) ABSTRACT

A heating apparatus, an image forming apparatus, and a liquid discharge apparatus. The heating apparatus includes a heating roller having a heat source inside, an end holder in which a portion of the heat source is disposed, the end holder holding an axial end of the heating roller rotatably, and an air supply device configured to supply air into the end holder in a direction intersecting with an axial direction of the heating roller. The heating apparatus includes a heating roller having a heat source inside, and an end holder in which a portion of the heat source is disposed, the end holder rotatably holding an axial end of the heating roller. In the heating apparatus, the end holder has an air inlet opening through which air is supplied into the end holder and an air outlet opening through which air is ejected outside from inside the end holder.

10 Claims, 6 Drawing Sheets

(58) Field of Classification Search
CPC ...... B41J 11/0022; B41J 3/60; B41J 11/0015; H05B 2203/032; H05B 3/0095; F26B 3/04; F26B 13/006; F26B 13/183; F26B 21/10; F26B 21/12; G03G 15/2053; G03G 15/2042
See application file for complete search history.

(56) References Cited

U.S. PATENT DOCUMENTS

| | | | |
|---|---|---|---|
| 2014/0253652 A1 | 9/2014 | Ohba et al. | |
| 2014/0294469 A1 | 10/2014 | Okuma et al. | |
| 2015/0210091 A1 | 7/2015 | Hoshina et al. | |
| 2016/0263913 A1 | 9/2016 | Akatsu et al. | |
| 2017/0090361 A1 | 3/2017 | Kuwana et al. | |
| 2017/0165981 A1 | 6/2017 | Kuwabara et al. | |
| 2017/0255136 A1 | 9/2017 | Yamashita et al. | |
| 2017/0333932 A1 | 11/2017 | Kuwabara | |
| 2022/0035287 A1 * | 2/2022 | Nanno | G03G 15/2039 |

FOREIGN PATENT DOCUMENTS

| | | |
|---|---|---|
| JP | 2013-068773 A | 4/2013 |
| JP | 2015-107865 A | 6/2015 |
| JP | 2017-065126 A | 4/2017 |
| JP | 2017-223917 A | 12/2017 |

* cited by examiner

HEATING APPARATUS, IMAGE FORMING APPARATUS, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application Nos. 2022-138083 and 2023-099234, filed on Aug. 31, 2022, and Jun. 16, 2023, respectively, in the Japan Patent Office, the entire disclosures of which are hereby incorporated by reference herein.

BACKGROUND

Technical Field

Embodiments of the present disclosure relate to a heating apparatus, an image forming apparatus, and a liquid discharge apparatus.

Background Art

As heating apparatuses provided for apparatuses such as image forming apparatuses, for example, drying devices that heat and dry a sheet onto which liquid such as ink is applied are known in the art.

For example, heating rollers having heat sources therein are proposed as drying devices. When an object to be heated such as a sheet of paper contacts the heating rollers heated by the heat sources, the heat is given from the heating rollers to the object to be heated and the object to be heated is heated.

SUMMARY

Embodiments of the present disclosure described herein provide a heating apparatus, an image forming apparatus, and a liquid discharge apparatus. The heating apparatus includes a heating roller having a heat source inside, an end holder in which a portion of the heat source is disposed, the end holder holding an axial end of the heating roller rotatably, and an air supply device configured to supply air into the end holder in a direction intersecting with an axial direction of the heating roller.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
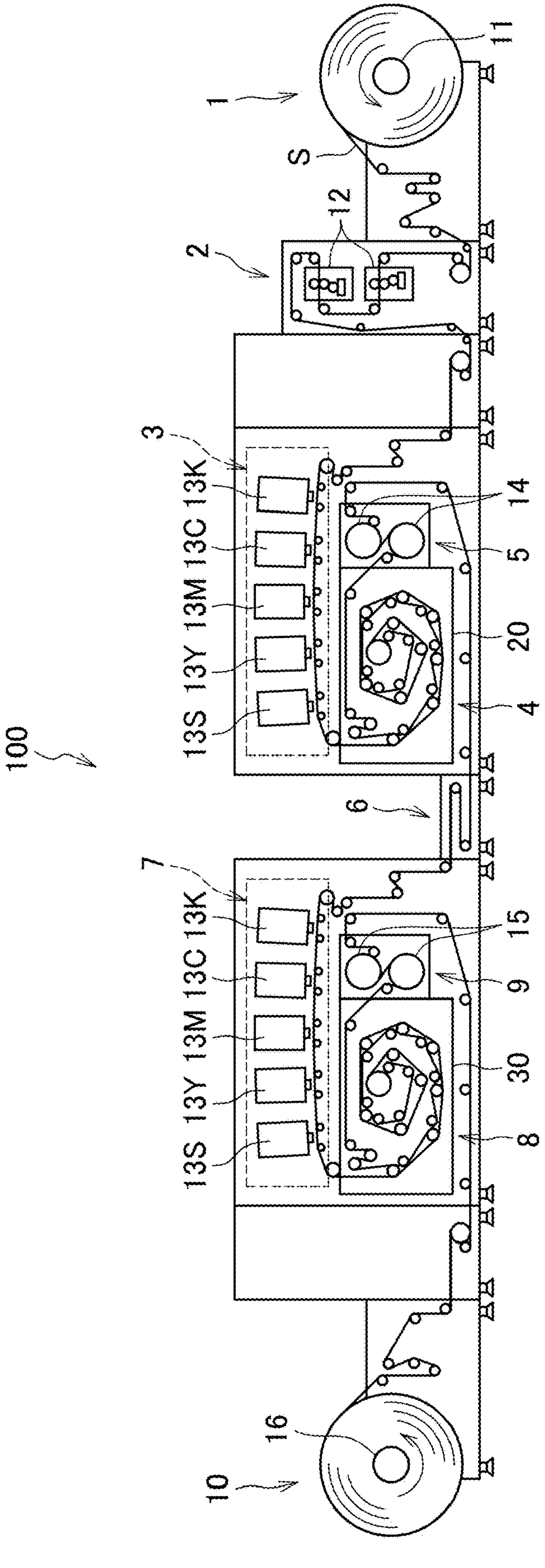
FIG. 1 is a schematic diagram of an inkjet image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms “a”, “an”, and “the” are intended to include the plural forms as well, unless the context clearly indicates otherwise. It will be further understood that the terms “includes” and/or “including”, when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

A drying device 20 provided for an image forming apparatus 100 according to an embodiment of the present disclosure that adopts inkjet printing is described below with reference to the drawings.

Firstly, an overall configuration of the image forming apparatus 100 according to the present embodiment that adopts inkjet printing is described with reference to FIG. 1.

FIG. 1 is a schematic diagram of the image forming apparatus 100 according to an embodiment of the present disclosure that adopts inkjet printing.

The image forming apparatus 100 according to the present embodiment as illustrated in FIG. 1 that adopts inkjet printing includes a sheet feeding unit 1, a preprocessor 2, a first image forming device 3, a first drier unit 4, a first cooling unit 5, a reversing unit 6, a second image forming device 7, a second drier unit 8, a second cooling unit 9, and a sheet collecting unit 10.

The sheet feeding unit 1 according to the present embodiment is provided with a sheet feeding roller 11 around which a long sheet S is wound and formed into a roll form. The sheet S is fed as the sheet feeding roller 11 rotates in the direction of the arrow as indicated in FIG. 1. The fed sheet S is supplied to the preprocessor 2.

The preprocessor 2 according to the present embodiment is provided with a treatment liquid applicator 12 that applies the treatment liquid to one side or both sides of the sheet S supplied from the sheet feeding unit 1. For example, the treatment liquid is liquid with a function to coagulate ink, and is applied by the treatment liquid applicator 12 onto the sheet S on which an image is not yet formed to prevent bleeding or feathering of ink or to assist permeation. As a result, image quality can be improved. The sheet S onto which the treatment liquid has been applied is supplied to the first image forming device 3.

The first image forming device 3 according to the present embodiment includes a plurality of liquid discharge heads 13S, 13Y, 13M, 13C, and 13K that serve as liquid discharge devices to eject liquid ink. In the present embodiment described with reference to FIG. 1, the liquid discharge head 13K used for black (K) ink, the liquid discharge head 13C used for cyan (C) ink, the liquid discharge head 13M used for magenta (M) ink, the liquid discharge head 13Y used for yellow (Y) ink, and the liquid discharge head 13S used for special color ink are arranged in the order listed from an upstream portion to a downstream portion of the apparatus in the conveyance direction of the sheet S. The special color ink is an ink other than black, cyan, magenta, and yellow ink such as white or metallic ink. Such special color ink is added as appropriate depending on the intended use. The order in which the multiple liquid discharge heads 13S, 13Y, 13M, 13C, and 13K are arranged is not limited to the order illustrated in FIG. 1, and the liquid discharge heads may be in any order. The ink according to the present embodiment is liquid that contains a colorant, a solvent, and particles of crystalline polymer dissolved by solvent, and the crystalline polymer undergoes a phase change and melts from a crystalline state into a liquid state when heated to a temperature equal to or higher than a certain melting point. Once the sheet S is supplied to the first image forming device 3, ink is discharged from each of the liquid discharge heads 13S, 13Y, 13M, 13C, and 13K to the first face of the sheet S, and an image is formed on the first face of the sheet S.

The first drier unit 4 includes a drying device 20 that heats the sheet S to dry the ink on the sheet S. When the sheet S is supplied from the first image forming device 3 to the first drier unit 4, the sheet S is heated by the drying device 20 and the ink on the sheet S is dried.

The first cooling unit 5 includes a plurality of cooling rollers 14. When the sheet S is supplied from the first drier unit 4 to the first cooling unit 5, the sheet S is cooled as the sheet contacts the multiple cooling rollers 14.

The reversing unit 6 is configured by a known device that reverses the front and rear sides of the sheet S. When the sheet S that is supplied from the first cooling unit 5 passes through the reversing unit 6, the front and rear sides of the sheet S are turned and the sheet S is sent to the second image forming device 7. For example, when the sheet S is supplied to the reversing unit 6 with the front side facing upward, the sheet S is reversed such that the front side faces downward and the rear side faces upward and is supplied to the second image forming device 7.

In a similar manner to the first image forming device 3 as above, the second image forming device 7 includes a plurality of liquid discharge heads 13S, 13Y, 13M, 13C, and 13K. However, unlike the first image forming device 3, an image is formed on the rear side of the sheet S instead of the front side in the second image forming device 7. Such a rear side of the sheet S may be referred to as the second face in the following description.

The front and rear sides of the sheet S are turned by the reversing unit 6 and the sheet S is supplied to the second image forming device 7. Accordingly, once the sheet S is supplied to the second image forming device 7, ink is discharged from each of the liquid discharge heads 13S, 13Y, 13M, 13C, and 13K to the rear side of the sheet S, and an image is formed on the rear side of the sheet S.

The second drier unit 8 and the second cooling unit 9 are configured in a similar manner to the first drier unit 4 and the first cooling unit 5 as above. Accordingly, once the sheet S is supplied to the second drier unit 8 after an image is formed on the rear side of the sheet S in the second image forming device 7 as above, the sheet S is heated by the drying device 30 of the second drier unit 8 and the ink on the sheet S is dried. Subsequently, the sheet S is cooled by the cooling roller 15 of the second cooling unit 9.

The sheet collection unit 10 is provided with a collection roller 16 that winds and collects the sheet S. As the collection roller 16 is driven to rotate in the direction indicated by the arrow in FIG. 1, the sheet S is wound in a roll form and collected.

A basic configuration of the drying device 20 and the drying device 30 that are provided for the first drier unit 4 and the second drier unit 8, respectively, is described with reference to FIG. 2 and FIG. 3.

Figure 2:
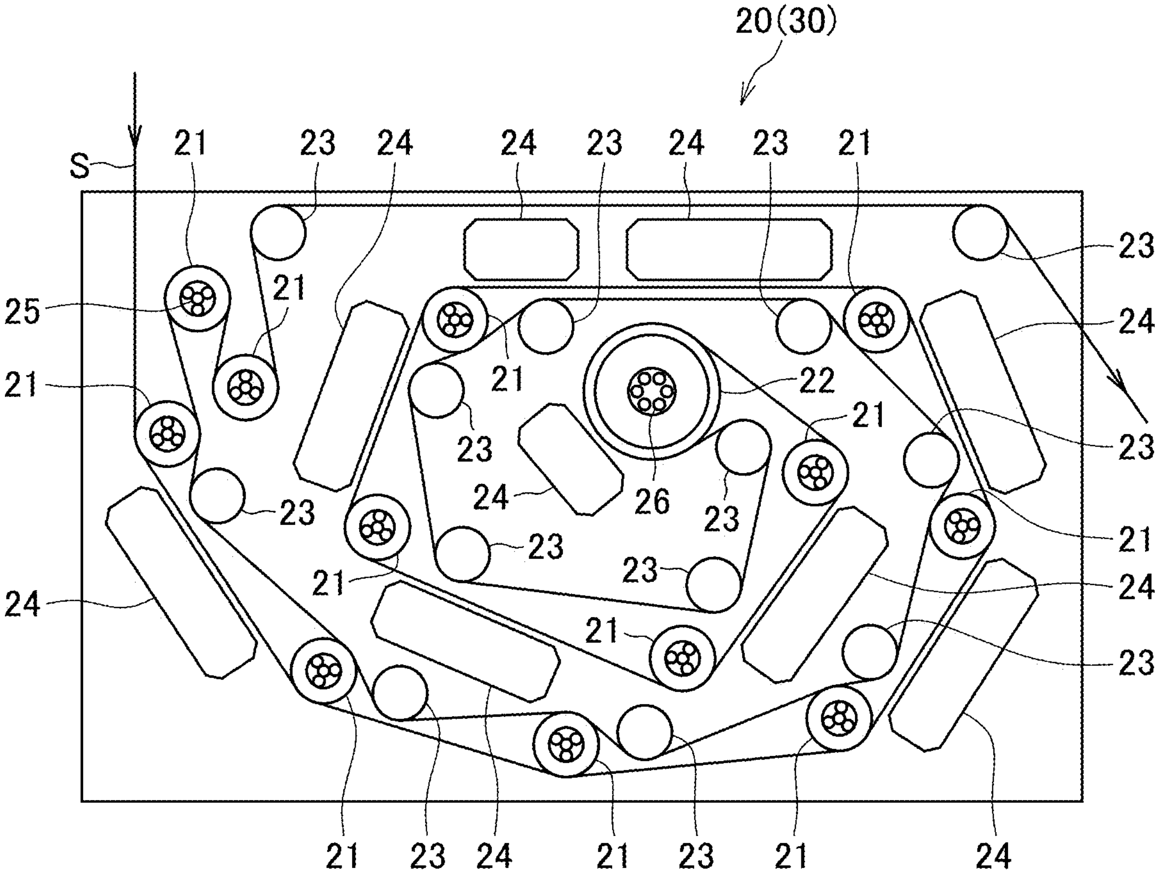
FIG. 2 is a schematic diagram of a drying device according to an embodiment of the present disclosure.

FIG. 2 is a schematic diagram of the drying device 20 or 30 according to the present embodiment.

Figure 3:
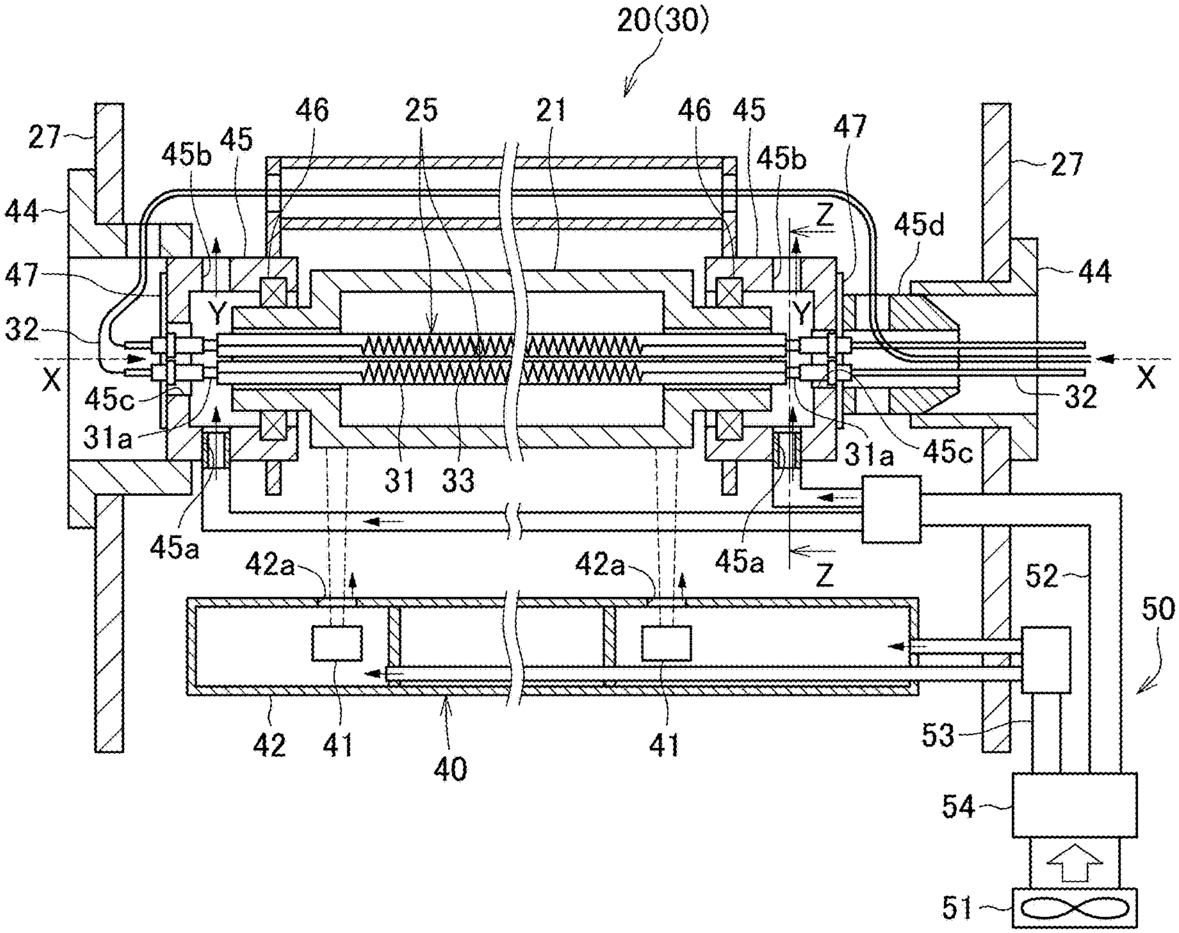
FIG. 3 is a sectional view of a heating roller of a drying device and parts or elements around the drying device, according to an embodiment of the present disclosure.

FIG. 3 is a sectional view of a plurality of heating rollers 21 of the drying device 20 or 30 and parts or elements around the drying device 20 or 30, according to the present embodiment.

As the configuration or structure of the drying device 20 is equivalent to the configuration or structure of the drying device 30, only the configuration or structure of the drying device 20 on one hand will be described, and the description of the configuration or structure of the drying device 30 on the other hand will be omitted.

As illustrated in FIG. 2, the drying device 20 according to the present embodiment is provided with a plurality of heating rollers 21, one heating drum 22, a plurality of guide rollers 23, and a plurality of air blowing units 24.

The heating drum 22 is a roller (cylindrical member) having a diameter wider than the diameter of the multiple heating rollers 21, and a halogen heater 26 that serves as a heat source is arranged inside the heating drum 22. By contrast, each one of the multiple heating rollers 21 is a roller (cylindrical member) having a diameter narrower than the diameter of the heating drum 22, and a halogen heater 25 that serves as a heat source is arranged inside each one of the multiple heating rollers 21. The multiple heating rollers 21 and the heating drum 22 are contact heating means for contacting and heating the sheet S to be heated.

The multiple heating rollers 21 and the multiple guide rollers 23 are spirally arranged around the heating drum 22. Unlike the multiple heating rollers 21 and the heating drum 22, each one of the multiple guide rollers 23 according to the present embodiment does not have a heat source such as a halogen heater therein, and serves as a guide unit to guide the sheet S.

The sheet S is looped over the multiple heating rollers 21 and the heating drum 22 in addition to the multiple guide rollers 23. Due to such configurations as described above, a guide path along which the sheet S is guided is arranged.

When the sheet S is conveyed into the drying device 20, firstly, the sheet S is stretched over the outer sides of the multiple heating rollers 21. The sheet S is conveyed while contacting the outer sides of the multiple heating rollers 21, and is then looped around the heating drum 22. Further, the sheet S is stretched from the heating drum 22 to the multiple guide rollers 23, and is conveyed while contacting the inner sides of the multiple heating rollers 21. As described above, the sheet S is conveyed while contacting the outer sides of the multiple heating rollers 21, and then is looped around the heating drum 22. Further, as the sheet S is conveyed while contacting the inner sides of the multiple heating rollers 21, the sheet S is efficiently heated and drying of the ink on the sheet S is accelerated.

The multiple air blowing units 24 are arranged at a plurality of places where the sheet S is stretched by the multiple heating rollers 21 and the multiple guide rollers 23 and at a position facing the heating drum 22. As the air is blown to the sheet S from those air blowing units 24, the drying of the ink on the sheet S is further accelerated. Subsequently, the sheet S is conveyed outside the drying device 20.

FIG. 3 is a sectional view of the heating roller 21 of the drying device 20 and parts or elements around the drying device 20, according to the present embodiment.

In the drying device 20 according to the present embodiment as illustrated in FIG. 3, the heating roller 21 is rotatably supported by a pair of side plates 27 that make up a housing of the drying device 20. More specifically, both ends of the heating roller 21 in the axial direction are rotatably held by a pair of end holders 45 each of which has a bearing 46 inwardly. Each one of the pair of end holders 45 is inserted into a tubular holding member 44 attached to each one of the pair of side plates 27 and is fixed therein. In other words, the heating roller 21 is held by the pair of end holders 45 that are fixed so as not to rotate, and the heating roller 21 can rotate relative to the pair of end holders 45 having the pair of bearings 46 therebetween. In the present embodiment, a fitting part 45*d* having a tapered shape that gets thinner toward the end is provided for one of the pair of end holders 45 on the right side in FIG. 3 in order to facilitate the insertion of the pair of end holders 45 into the pair of tubular holding members 44.

On the other hand, both ends of each one of the multiple halogen heaters 25 in the longer-side direction that are arranged in the heating roller 21 are fixed to the pair of end holders 45 through plate-like fixation members 47 so as not to rotate. Due to such a configuration, the multiple halogen heaters 25 do not rotate even w % ben the heating roller 21 rotates. The multiple halogen heaters 25 that are arranged in the heating roller 21 may be one halogen heater in an alternative embodiment.

Each one of the multiple halogen heaters 25 according to the present embodiment is a photothermal heat source that radiates infrared (IR) light to heat an object to be heated by the radiant heat of the radiated IR light. More specifically, each one of the multiple halogen heaters 25 according to the present embodiment is composed of, for example, a filament 33 that serves as a heating element, and a light-emitting tube 31 having a cylindrical shape to accommodate the filament 33. The filament 33 according to the present embodiment is formed by winding a metal wire made of, for example, tungsten (W) in a coil shape. The light-emitting tube 31 according to the present embodiment is formed of a material such as lime glass or quartz glass that transmits infrared (IR) light. Moreover, the light-emitting tube 31 accommodates the filament 33, and is filled with substances such as halogen, halide, and inert gas. In order to handle such a situation, a pair of sealing portions 31*a* are formed at both ends of the light-emitting tube 31 such that the gas inside does not leak. Once a pair of feeder lines 32 are coupled to both ends of the filament 33 and the power supply circuit starts supplying power to the filament 33 through the feeder lines 32, the filament 33 starts emitting and radiating infrared (IR) light. When the inner surface of the heating roller 21 is irradiated with the radiated IR light, the multiple heating rollers 21 are heated. In particular, both ends of the heating roller 21 that are held by the pair of end holders 45 in the present embodiment are formed to be thinner than the central portion of the heating roller 21. Due to such a configuration, heat in the multiple heating rollers 21 is prevented from flowing out from both ends, and the multiple heating rollers 21 can be efficiently heated.

As illustrated in FIG. 3, the drying device 20 according to the present embodiment is provided with a temperature sensor unit 40 that detects the temperature of the multiple heating rollers 21. The temperature sensor unit 40 is arranged so as to face the multiple heating rollers 21, and has a plurality of temperature sensors 41 and a housing 42 shaped like a box to store the multiple temperature sensors 41 therein. Each one of the multiple temperature sensors 41 is a non-contact temperature sensor that detects, for example, the infrared (IR) light radiated from an object to be detected, and detects the temperature of the multiple heating rollers 21 through a plurality of openings 42*a* for detection arranged on the housing 42. Once the temperatures of the multiple heating rollers 21 are detected by the multiple temperature sensors 41, a control unit as will be described later in detail controls the heat liberation or light emission of the halogen heaters 25 based on the detected temperatures. Due to such a configuration, the surface temperatures of the multiple heating rollers 21 are maintained at a predetermined temperature.

Typically, the life of the halogen heater depends on the heat resistance property of the filament or the heat resistance property of the light-emitting tube. For this reason, if the temperature of the filament or the light-emitting tube exceeds the temperature of their heat resistance, the filament or the light-emitting tube may deteriorate or may be damaged, and the life of the halogen heater may be shortened. In particular, there are some cases in which the sealing portion of the light-emitting tube cracks at high temperatures due to its structural weakness. More specifically, when the temperature increases on the sealing portion, the metallic foils that are arranged in the sealing portion are oxidized and expanded, and the sealing portion spreads from the inside due to such expansion. Cracks on the sealing portion may appear when the sealing portion cannot resist such spreading force.

As described above, there are some cases in which the halogen heater is damaged when the temperature rises excessively on the sealing portion. For this reason, rises in temperature on the sealing portion need to be controlled. In order to achieve such configurations, in the present embodiment described with reference to FIG. 3, the pair of sealing portions 31*a* are arranged outside both ends of each one of the multiple heating rollers 21, and both ends of each one of the multiple heating rollers 21 are made thin such that the heat inside the multiple heating rollers 21 hardly leaks out to the outside. Due to such configurations as described above, the multiple sealing portions 31*a* according to the present embodiment are insusceptible to the heat of the multiple heating rollers 21.

However, when a thick sheet is conveyed or when the conveyance speed of the sheet is increased in order to increase the productivity, it is necessary to turn on the halogen heater more frequently. As a result, the temperatures of the multiple sealing portions tend to increase. In such cases, the sealing portions tend to deteriorate or be damaged with the halogen heaters of the heat resistance as known in the art.

As measures against the deterioration or damage on the multiple sealing portions caused by such rises in temperature as described above, the air used for cooling may be blown to the multiple sealing portions to reduce the rises in temperature on the sealing portions.

For example, in the configuration or structure described with reference to FIG. 3, a pair of holes 45*c* that expose the ends of the multiple halogen heaters 25 to the outside are formed on the pair of end holders 45 in which the multiple sealing portions 31*a* are arranged, and the air that is used for cooling can be supplied through the pair of holes 45*c*. By so doing, the multiple sealing portions 31*a* in the pair of end holders 45 can be cooled.

However, for example, the pair of fixation members 47 that fix the ends of the halogen heater 25 and the multiple feeder lines 32 coupled to the ends of the halogen heater 25 prevent the air supply in the above measures as the air is supplied into the pair of end holders 45 in the axial direction of the heating roller 21 parallel to the X-axis direction as indicated by arrows in FIG. 3, and a sufficient volume of air cannot be supplied to the multiple sealing portions 31*a*.

Moreover, the inside of the end holder 45 and the inside of the heating roller 21 communicate with each other. For this reason, when the air is supplied into the end holders 45 in the axial direction of the multiple heating rollers 21, the air flows into the multiple heating rollers 21, and the heating efficiency of the multiple heating rollers 21 is reduced.

In view of the above circumstances, the following configuration or structure is adopted in the present embodiment in order to achieve efficient heating of the multiple heating rollers 21 and effective cooling of the multiple sealing portions 31*a*. A configuration or structure of the air supply device 50 according to the present embodiment is described below.

As illustrated in FIG. 3, the drying device 20 according to the present embodiment is provided with the air supply device 50 used to supply each one of the multiple end holders 45 with cooling air. The air supply device 50 according to the present embodiment is provided with a blower 51 composed of, for example, an air-blowing fan, and an air-supply path 52 composed of, for example, an air-supply tube. The air-supply path 52 is branched at some midpoint such that air can be guided from the blower 51 to each of the two end holders 45. Each one of the multiple end holders 45 has an air inlet opening 45*a* used to supply air inside the end holder 45 and an air outlet opening 45*b* used to discharge the air outside the end holder 45. One end of the air-supply path 52 is coupled to the air inlet opening 45*a*.

In the present embodiment, the air inlet opening 45*a* and the air outlet opening 45*b* are arranged so as to face each other across the multiple sealing portions 31*a* in a direction orthogonal to the axial direction of the heating roller 21, which is the Y-direction indicated by arrow in FIG. 3. Due to such a configuration, when air is supplied from the blower 51 through the air-supply path 52, air is supplied to the inside through the air inlet opening 45*a* of the end holder 45, and the supplied air is ejected to the outside through the air outlet opening 45*b*. In other words, the air passes through the end holder 45 in a direction orthogonal to the axial direction of the heating roller 21. In so doing, the multiple sealing portions 31*a* are cooled by the air blown to the multiple sealing portions 31*a*.

As described above, in the present embodiment, the direction in which the air is supplied into the end holder 45 is made parallel to a direction orthogonal to the axial direction of the heating roller 21. Due to such a configuration, the supply of air is not prevented by, for example, the fixation member 47 and the feeder line 32. Due to such configurations as described above, a sufficient volume of air can be supplied to the multiple sealing portions 31*a*, and the rises in temperature on the multiple sealing portions 31*a* can effectively be prevented. As the air is supplied in a direction orthogonal to the axial direction of the heating roller 21, it becomes difficult for the air to flow into the multiple heating rollers 21. Accordingly, the reduction in heating efficiency of the multiple heating rollers 21 due to the air flown therein can be avoided.

With the configuration or structure according to the present embodiment, both efficient heating of the multiple heating rollers 21 and effective cooling of the multiple sealing portions 31*a* can be achieved.

When high-powered halogen heaters are used in the related art, the temperatures of the multiple sealing portions could reach 400 degrees Celsius ° C. With the adoption of the embodiments of the present disclosure, the rises in temperature on the sealing portions can be reduced to approximately 240 degrees Celsius ° C. that is lower than the heat resistance of 300 degrees Celsius ° C. Accordingly, deterioration or breakage of the multiple sealing portions 31*a* can be prevented in the present embodiment even when high-powered halogen heaters are used, and the longevity of the halogen heater 25 or the halogen heater 26 can be increased. In addition to the reduction in the temperature of the sealing portions, the temperature of the pair of end holders that accommodate the multiple sealing portions and the bearings arranged inside the pair of end holders can be prevented from increasing. In the example in which the rises in temperature on the sealing portions were successfully reduced to approximately 240 degrees Celsius ° C. the air is supplied at the air velocity of 2 meters (m) per second (s) in the configuration or structure described with reference to FIG. 3, where the air inlet opening 45*a* is a round hole with the diameter of 6.5 millimeters (mm) and the air outlet opening 45*b* is an elongated hole whose vertical length and horizontal length are 48 mm and 18 mm, respectively. However, no limitation is indicated thereby, and the size of the air inlet opening 45*a*, the size of the air outlet opening 45*b*, and the air velocity may be changed as desired according to, for example, the output power of the halogen heaters.

In order to efficiently cool the multiple sealing portions 31*a*, as in the present embodiment, it is desirable that the pair of air inlet openings 45*a* be arranged so as to face each other in a direction orthogonal to the axial direction of the multiple heating rollers 21 with respect to the multiple sealing portions 31*a*. Due to such a configuration, the air is effectively blown to the multiple sealing portions 31*a* through the air inlet opening 45*a*, and thus the multiple sealing portions 31*a* can be cooled efficiently. However, the position of the air inlet opening 45*a* is not limited to a position facing the multiple sealing portions 31*a*, and may be a position shifted from the multiple sealing portions 31*a*. Even in such cases, the air can easily be supplied into the end holder 45 compared with cases in which the air is supplied in the axial direction of the multiple heating rollers 21, and the effectiveness of the cooling of the multiple sealing portions 31*a* can be increased.

Figure 4:
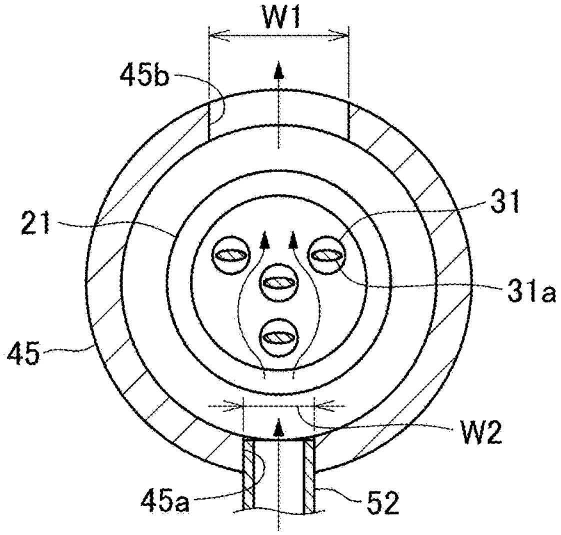
FIG. 4 is a Z-Z sectional view of the heating roller of the drying device and parts or elements around the drying device of FIG. 3, according to an embodiment of the present disclosure.

FIG. 4 is a Z-Z sectional view of one of the multiple heating rollers 21 of the drying device 20 and parts or elements around the drying device 20 of FIG. 3, according to the present embodiment.

As illustrated in FIG. 4 that is a Z-Z sectional view of one of the multiple heating rollers 21 of the drying device 20 and parts or elements around the drying device 20 of FIG. 3, it is desired that width W1 of the air outlet opening 45*b* be formed wider than width W2 of the air inlet opening 45*a*. In such cases, the area of the opening of the air outlet opening 45*b* is wider than the area of the opening of the air inlet opening 45*a*. Due to such a configuration, the air can be smoothly ejected from the air outlet opening 45*b*, and the air can be prevented from staying in the end holder 45. As a result, the air can be smoothly supplied into the pair of end holders 45. Accordingly, a sufficient volume of air that is blown to the multiple sealing portions 31*a* can be achieved, and the multiple sealing portions 31*a* can be cooled effectively. As the retention of the air in the pair of end holders 45 is prevented, the air can also be prevented from entering the multiple heating rollers 21. Accordingly, the reduction in heating efficiency of the multiple heating rollers 21 due to the air flown therein can be avoided in a highly advanced manner. As illustrated in FIG. 3 and FIG. 4, it is desirable that the air inlet opening 45*a* and the air outlet opening 45*b* be arranged so as to face each other in a direction orthogonal to the axial direction of the multiple heating rollers 21. Due to such a configuration, the air from the air outlet opening 45*b* can be discharged smoothly. However, the air outlet opening 45*b* according to the present embodiment is not limited to cases in which the air inlet opening 45*a* and the air outlet opening 45*b* are arranged so as to face each other, and the air inlet opening 45*a* and the air outlet opening 45*b* may be arranged so as to be shifted from each other.

In the configuration or structure involving the multiple temperature sensors 41 of non-contact type as in the present embodiment, erroneous detection may occur when a foreign matter such as dust adheres to a detection face of any one of the multiple temperature sensors 41. In order to handle such a situation, in the present embodiment described with reference to FIG. 3, the air-supply path 53 is extended from the blower 51 to the temperature sensor unit 40 such that the air can be supplied from the blower 51 into the temperature sensor unit 40. When the air is supplied into the housing 42 of the temperature sensor unit 40, the inside of the housing 42 is put under positive pressure, and the air is ejected through the multiple openings 42*a* for detection arranged on the housing 42. Due to such a configuration, it becomes difficult for a foreign matter to enter the temperature sensor unit 40 through the multiple openings 42*a* for detection. As a result, the adhesion of a foreign matter to the detection face of the temperature sensors 41 can be prevented, and the detection face can be maintained in a good state.

As described above, the air supply device 50 according to the present embodiment supplies air not only into the end holder 45 but also into the temperature sensor unit 40. Due to such a configuration, not only the rises in temperature on the multiple sealing portions 31*a* of the multiple halogen heaters 25 can be prevented, and but also the dirt on the detection face of the temperature sensor 41 can be reduced.

Further, in the present embodiment, the air can be supplied to both the inside of the pair of end holders 45 and the inside of the temperature sensor unit 40, using a single blower 51 in common. Accordingly, the apparatus according to the present embodiment can be downsized and produced at low cost. In other words, the air can be guided from the blower 51 into both the pair of end holders 45 and the temperature sensor unit 40 by the air-supply path 52 and the air-supply path 53 that are branched from the blower 51 into the pair of end holders 45 and the temperature sensor unit 40, respectively. Due to such a configuration, a blower used to supply the air to the pair of end holders 45 and a blower used to supply the air to the temperature sensor unit 40 do not need to be arranged on an individual basis. Accordingly, in the present embodiment, the number of blowers to be arranged can be reduced, and the apparatus according to the present embodiment can be downsized and produced at low cost.

The volume of the air supplied into the temperature sensor unit 40 is sufficient as long as the inside of the temperature sensor unit 40 can be kept under positive pressure. By contrast, it is desired that the volume of the air supplied into the pair of end holders 45 be adjusted as desired according to the degree of the temperature rise at the multiple sealing portions 31*a*. However, when the volume of the air supplied into the temperature sensor unit 40 increases with an increase in the volume of the air supplied into the pair of end holders 45, the volume of the air that is blown to the outer face of the heating roller 21 through the multiple openings 42*a* for detection increases, and the temperatures of the multiple heating rollers 21 may decrease.

In order to handle such a situation, in the present embodiment, the volume of the air to be supplied to each one of the end holder 45 and the temperature sensor unit 40 can be adjusted on an individual basis. More specifically, as illustrated in FIG. 3, an air adjustment valve 54 is arranged at a portion where the air-supply path 52 and the air-supply path 53 are branched, and the opening rate of the air adjustment valve 54 is changed. By so doing, the opened area in the air-supply path 52 and the opened area in the air-supply path 53 can be changed. Due to such a configuration, the volume of the air that is used for cooling and is supplied from the blower 51 into the end holder 45 and the volume of the air that is used for maintenance and is supplied from the blower 51 into the temperature sensor unit 40 can be adjusted.

The opening rates of the air adjustment valve 54 according to the present embodiment are described above with reference to a first table given below. In the present embodiment described with reference to the first table, the opening rate of the air adjustment valve 54 is changed depending on the conditions or various kinds of operations of the image forming apparatus 100. By so doing, the volume of each one of the air used for cooling and the air used for maintenance can be adjusted accordingly.

First Table

| | OPENING RATES OF THE AIR ADJUSTMENT VALVE | |
|---|---|---|
| | AIR USED FOR COOLING | AIR USED FOR MAINTENANCE |
| NORMAL PRINTING OPERATIONS (FIRST STATE) | 50% | 50% |
| HEAVY-DUTY PRINTING OPERATIONS (SECOND STATE) | 70 TO 80% | 20 TO 30% |
| CLEANING OPERATION (THIRD STATE) | 0% | 100% |

In the present embodiment described with reference to the first table, the opening rate of each one of the air used for cooling and the air used for maintenance of the air adjustment valve 54 is all 50% under the normal printing operations (first state). By contrast, under the heavy-duty, printing operations (second state) in which the halogen heaters 25 in the multiple heating rollers 21 need to be turned on under heavier duty than usual, where the ratio of time of energization per unit time is higher than usual, the temperatures of the multiple sealing portions 31*a* increase. Under such heavy-duty printing operations, for example, a thick sheet is to be conveyed or the conveying speed of the sheet is to be increased. In order to handle such a situation, the opening rate of the air used for cooling is increased and adjusted to the range of 70 to 80%. Accordingly, the volume of the air used for cooling increases, and the rises in temperature on the multiple sealing portions 31*a* can effectively be prevented. On the other hand, the opening rate of the air used for maintenance decreases and is adjusted to the range of 20 to 30%. Accordingly, a volume of air sufficient enough to reduce the dirt on the multiple temperature sensors 41 can be achieved, and the volume of the air used for maintenance does not increase to an excessive degree. Accordingly, falls in temperature on the multiple heating rollers 21 due to an increase in the volume of air can be avoided.

During the cleaning operation (third state) depicted in the first table, a foreign matter that adheres to, for example, the detection face of any one of the multiple temperature sensors 41 is removed by the air. In such cases, the opening rate of the air used for maintenance is set to 100%, and the volume of the air to be supplied into the temperature sensor unit 40 is increased to be more than usual. As a result, a foreign matter that adheres to the detection faces of the multiple temperature sensors 41 can be removed by air. On the other hand, the opening rate of the air used for cooling is 0%, and thus air cannot be blown to any one of the multiple sealing portions 31*a*. For this reason, it is desired that the cleaning operation be performed when the multiple sealing portions 31*a* are not necessarily cooled, except when the printing operation is being performed.

The opening rates of the air adjustment valve 54 depicted in the above first table are given by way of example, and such opening rates can be adjusted as desired according to, for example, the performance, configuration, or structure of the image forming apparatus.

Figure 5:
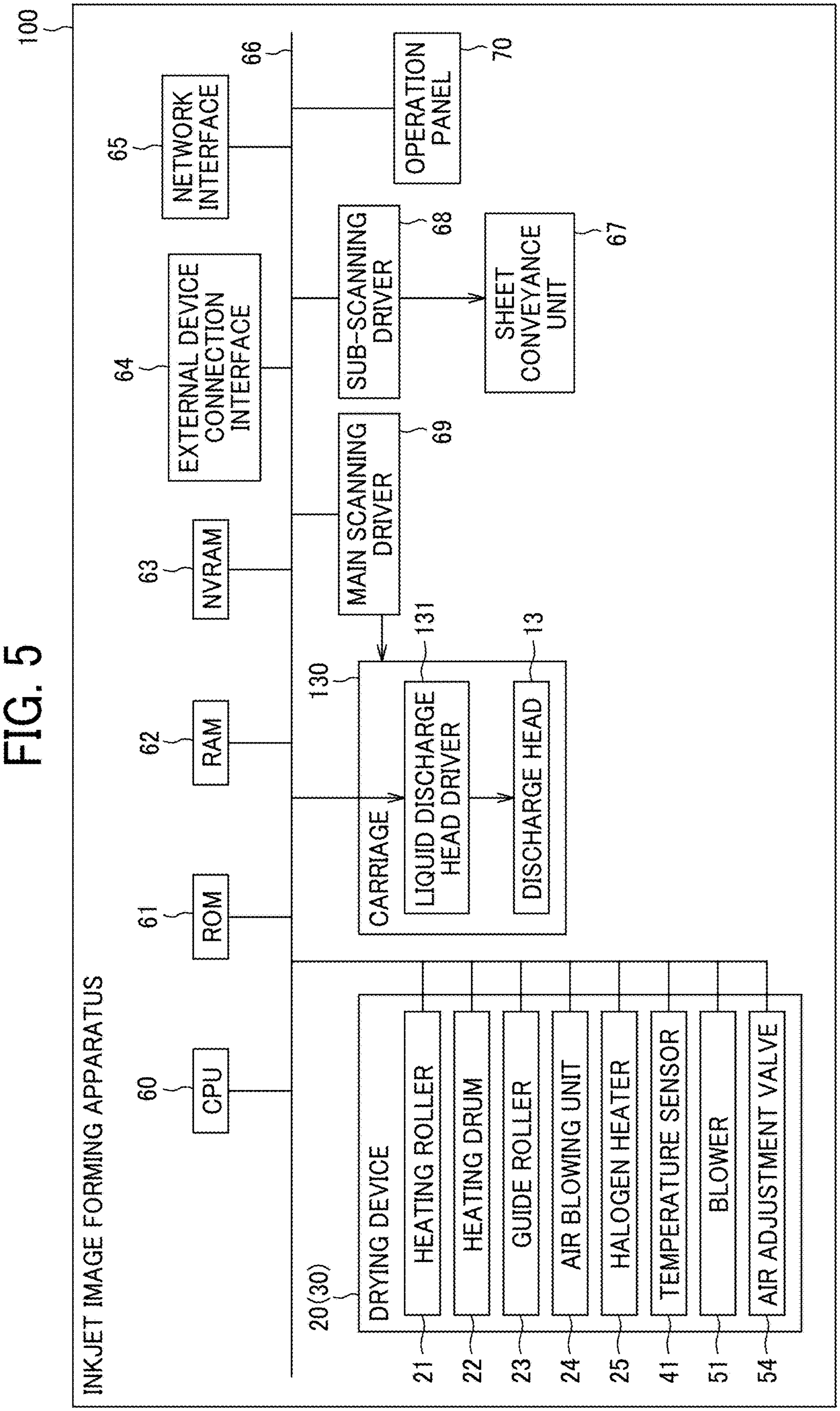
FIG. 5 is a block diagram illustrating a control system of an image forming apparatus according to an embodiment of the present disclosure.

The control of the air adjustment valve 54 as described above is performed by the CPU 60 that serves as a control unit as illustrated in FIG. 5, based on, for example, the operation mode selected by an operator or the turn-on duty of the multiple halogen heaters 25 in the multiple heating rollers 21. In such cases, each one of the control unit (CPU 60) and the air adjustment valve 54 serves as an airflow-rate changer that changes the volume of the air supplied into each one of the pair of end holders 45 and the temperature sensor unit 40.

FIG. 5 is a block diagram illustrating a control system of the image forming apparatus 100 according to the present embodiment.

As illustrated in FIG. 5, the image forming apparatus 100 according to the present embodiment includes a central processing unit (CPU) 60, a read-only memory (ROM) 61, a random access memory (RAM) 62, a non-volatile random access memory (NVRAM) 63, an external device connection interface (I/F) 64, a network interface (I/F) 65, and a bus line 66. The image forming apparatus 100 also includes a sheet conveyance unit 67, a sub-scanning driver 68, a main scanning driver 69, a carriage 130, and an operation panel 70. The carriage 130 according to the present embodiment includes a plurality of liquid discharge heads 13 and a liquid discharge head driver 131.

Among these elements, the CPU 60 controls all operations of the image forming apparatus 100. The ROM 61 according to the present embodiment stores a program such as an initial program loader (IPL) used to drive the CPU 60. The RAM 62 is used as a work area of the CPU 60. The NVRAM 63 stores various kinds of data such as a program, and retains various kinds of data while the power source for the image forming apparatus 100 is cut out.

The external device connection interface 64 is coupled to a personal computer (PC) through, for example, a universal serial bus (USB) cable, and communicates with the PC to exchange a control signal or print data with the PC. The network interface 65 is an interface used to exchange data with an external device through a communication network such as the Internet. The bus line 66 is, for example, an address bus or a data bus, which electrically connects the multiple elements such as the CPU 60 to each other.

The sheet conveyance unit 67 uses, for example, a roller and a motor used to drive the roller, and conveys the sheet S intermittently in the sub-scanning direction parallel to the sheet conveyance direction, along the conveyance path in the image forming apparatus 100. The sub-scanning driver 68 is a driver that controls the conveyance of the sheet S in the sub-scanning direction by the sheet conveyance unit 67.

The carriage 130 according to the present embodiment is a head holding member provided with the multiple liquid discharge heads 13, and is movable in the main scanning direction intersecting the sheet conveyance direction. While the carriage 130 is moving in the main scanning direction, ink is discharged from the multiple liquid discharge heads 13 onto the sheet, which is intermittently conveyed in the sub-scanning direction. As a result, an image is formed at a prescribed position of the sheet. In so doing, the main scanning driver 69 controls the movement of the carriage 130 in the main scanning direction, and the liquid discharge head driver 131 controls the operation of the liquid discharge heads 13.

It is not always necessary for the liquid discharge head driver 131 to be provided for the carriage 130. Alternatively, the liquid discharge head driver 131 may be coupled to the bus line outside the carriage 130. Each one of the main scanning driver 69, the sub-scanning driver 68, and the liquid discharge head driver 131 may be a function implemented by a command executed by the CPU 60 based on a program.

The operation panel 70 according to the present embodiment is composed of, for example, a touch panel and an alarm lamp that display, for example, current set values and panel of options to be selected and accept inputs from an operator.

The CPU 60 according to the present embodiment also controls the operations of other various types of components of the drying device 20 (or 30) provided for the image forming apparatus 100. For example, the CPU 60 controls the rotation of the multiple heating rollers 21, the heating drum 22, and the multiple guide rollers 23, the air-blowing operation of the air blowing unit 24, the air-blowing operation of the blower 51, and the opening rate of the air adjustment valve 54. The CPU 60 also controls the heat generated by the multiple halogen heaters 25 inside the multiple heating rollers 21 based on the temperatures of the multiple heating rollers 21 detected by the temperature sensor 41.

Figure 6:
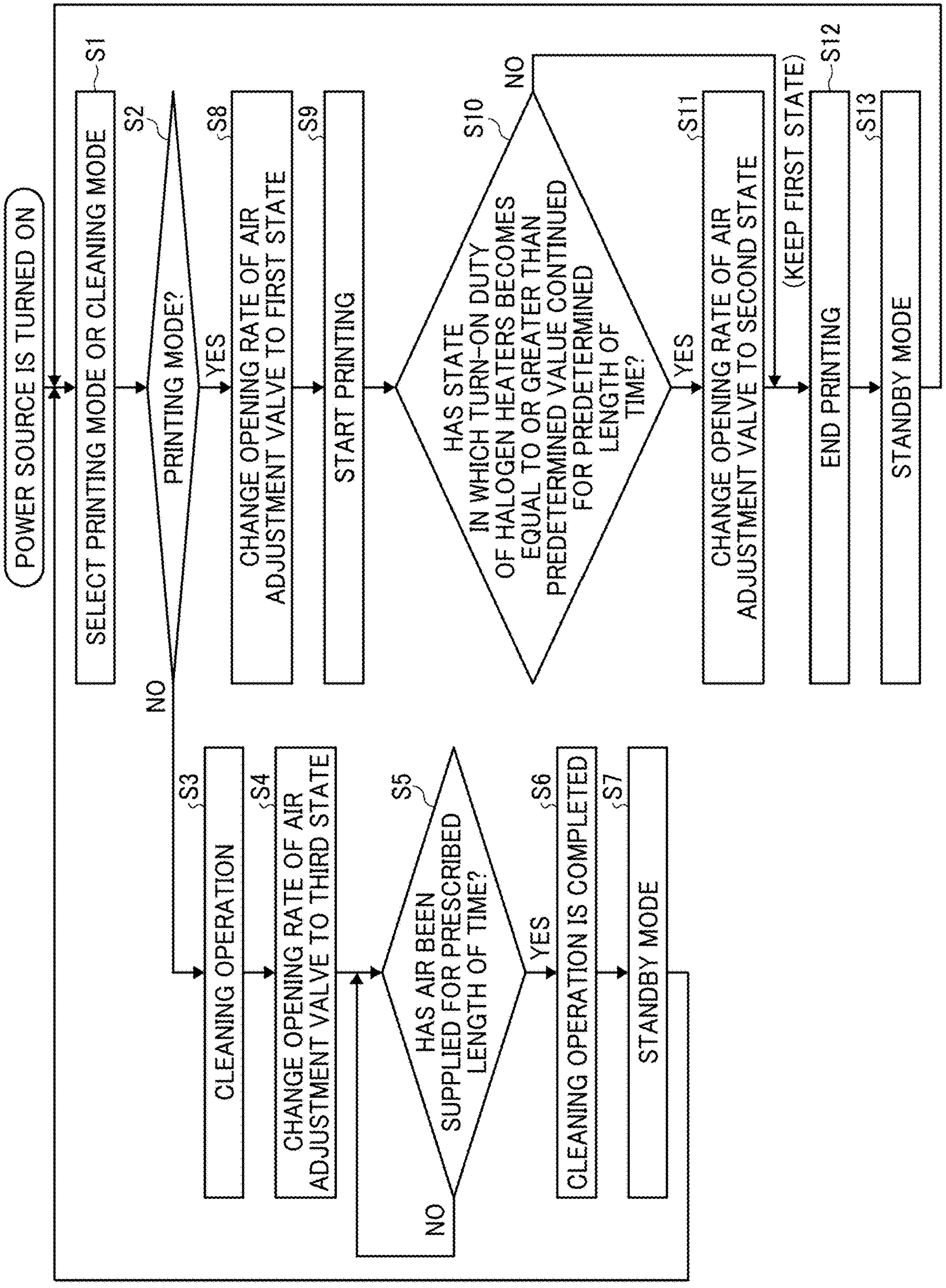
FIG. 6 is a diagram illustrating a flowchart of the controlling processes of an air supply unit according to an embodiment of the present disclosure.

FIG. 6 is a diagram illustrating a flowchart of the controlling processes of the air supply device 50 according to the present embodiment.

In the present embodiment described with reference to FIG. 6, after the power source of the image forming apparatus 100 is turned on, in a step S1, firstly, an operator selects a printing mode or cleaning mode. When the cleaning mode is selected ("NO" in the step S2), in a step S3, the cleaning operation is started by the above temperature sensors 41. Once the cleaning operation is started, in a step S4, the opening rate of the air adjustment valve 54 is changed to the third state listed in the first table, where the air used for cooling is 0% and the air used for maintenance is 100%. The air is supplied from the blower 51 into the temperature sensor unit 40 with the opening rate in the third state, and the cleaning operation is performed on the multiple temperature sensors 41. Subsequently, once the air is supplied for a preset or prescribed length of time ("YES" in a step S5), the supply of air is stopped, and in a step S6, the cleaning operation is completed. After completion of the cleaning operation, in a step S7, the image forming apparatus 100 changes its mode to a standby mode.

By contrast, when the mode that is selected after power is turned on is the print mode ("YES" in the step S2), in a step S8, the opening rate of the air adjustment valve 54 is changed to the first state listed in the first table, where the air used for cooling is 50% and the air used for maintenance is 50%. In a step S9, the printing starts with this opening rate. In so doing, the air is supplied from the blower 51 into both the pair of end holders 45 and the temperature sensor unit 40 with the opening rate in the first state, and the air is also supplied in order to cool the multiple sealing portions 31*a* and reduce the dirt on the multiple temperature sensors 41.

In the present embodiment, when the turn-on duty of the halogen heaters 25 becomes equal to or greater than a predetermined value in the heating roller 21 and such a state continues for a predetermined length of time before the printing operation ends ("YES" in a step S10), in a step S11, the opening rate of the air adjustment valve 54 is changed to the second state listed in the first table, where the air used for cooling is 70 to 80% and the air used for maintenance is 20 to 30%.

The temperatures of the multiple sealing portions 31*a* may increase under such conditions. In order to handle such a situation, the opening rate of the air used for cooling is increased to increase the volume of the air that is blown to the multiple sealing portions 31*a*. When the turn-on duty of the halogen heaters 25 does not become equal to or greater than a predetermined value or when the turn-on duty of the halogen heaters 25 becomes equal to or greater than a predetermined value but such a state does not continue for a predetermined length of time before the printing operation ends ("NO" in the step S10), The printing continues with the opening rate in the first state. Subsequently, when the printing ends in a step S12, the image forming apparatus 100 changes its mode to a standby mode in a step S13.

In the present embodiment described with reference to FIG. 6, when the printing mode is to be executed, printing starts with the opening rate of the air adjustment valve 54 set to the first state. However, the opening rate that is set at the time of starting printing is not necessarily the first state. For example, if the conditions such as the thickness of the sheet and the sheet conveyance speed for the printing to be performed next are the same as the previous printing conditions after the opening rate is changed to the second state and the printing ends, printing may be started with the opening rate set to the second state from the beginning.

The opening rate of the air adjustment valve 54 may be changed from the first state to the second state based on conditions other than the turn-on duty of the halogen heaters 25. For example, the temperatures of the multiple sealing portions 31*a* may increase when the conveying speed of the sheet is increased. In order to handle such a situation, the timing at which the opening rate of the air adjustment valve 54 is to be changed may be determined based on the conditions in the sheet conveyance speed in place of the conditions in turn-on duty. In other words, the opening rate of the air adjustment valve 54 may be changed from the first state to the second state when the conveyance speed of the sheet becomes equal to or greater than a predetermined value and such a state continues for a predetermined length of time before the printing operation ends.

The supply of air from the blower 51 in the print mode may be terminated at the same time as the end of printing. Alternatively, the supply of air from the blower 51 in the print mode may be continued after the halogen heaters 25 are turned off, without being terminated when printing ends.

Figure 7:
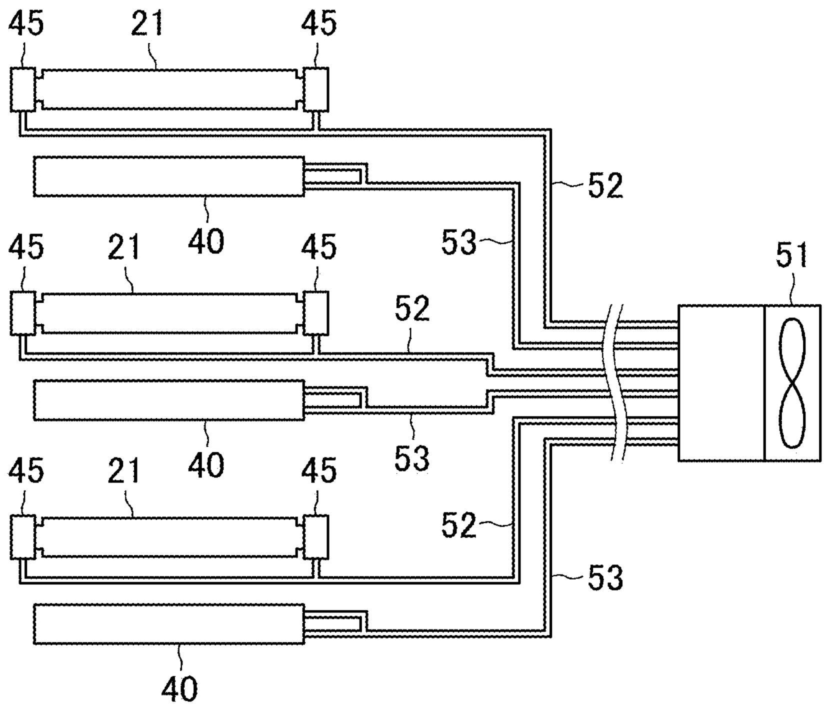
FIG. 7 is a diagram illustrating an air supply unit according to an alternative embodiment of the present disclosure.

FIG. 7 is a diagram illustrating the air supply device 50 according to an alternative embodiment of the present disclosure.

The embodiments of the present disclosure are not limited to cases in which air is supplied from one blower 51 to the pair of end holders 45 provided for one heating roller 21 as well as one temperature sensor unit 40, as described above with reference to FIG. 3. As illustrated in FIG. 7, air may be supplied from one blower 51 to the multiple end holders 45 provided for the multiple heating rollers 21 as well as the multiple temperature sensor units 40.

In other words, the blower 51 may be provided for the end holder 45 and the temperature sensor unit 40 on a one-by-one basis. Further, the output of the multiple blowers 51 may be controlled by a control unit such as the above CPU 60 that serves as an airflow-rate changer to adjust the volume of the air to be supplied to each one of the end holder 45 and the temperature sensor unit 40 on an individual basis.

Figure 8:
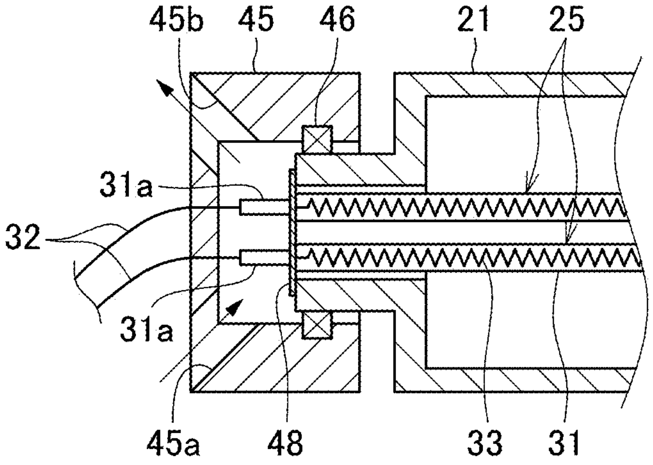
FIG. 8 is a diagram illustrating a partition and an air inlet opening and an air outlet opening arranged at oblique angles, according to an alternative embodiment of the present disclosure.

FIG. 8 is a diagram illustrating a partition 48 and the air inlet opening 45*a* and the air outlet opening 45*b* arranged at oblique angles, according to an alternative embodiment of the present disclosure.

As in the present embodiment described with reference to FIG. 8, each one of the air inlet opening 45*a* and the air outlet opening 45*b* may be arranged in a slanting direction with respect to the multiple sealing portions 31*a*, where such a slanting direction intersects with the axial direction of the heating roller 21. In such cases, the air is supplied in a slanting direction through the air inlet opening 45*a*. Accordingly, the air supply is not prevented by, for example, the feeder lines 32, and the multiple sealing portions 31*a* can be cooled effectively. As described above, it is not always necessary for the air inlet opening 45*a* and the air outlet opening 45*b* to be arranged with respect to the multiple sealing portions 31*a* in a direction orthogonal to the axial direction of the heating roller 21, and it is not always necessary for the air to be supplied and ejected in a direction orthogonal to the axial direction of the heating roller 21. Alternatively, the air inlet opening 45*a* and the air outlet opening 45*b* may be arranged in a slanting direction with respect to the multiple sealing portions 31*a*, and the air may be supplied and ejected in a slanting direction. In other words, in the present embodiment, the direction in which the air inlet opening 45*a* is arranged, the direction in which the air outlet opening 45*b* is arranged, the directions in which the air is supplied and ejected are satisfactory as long as those directions intersect with the axial direction of the heating roller 21, including an orthogonal direction and a slanting direction with respect to the axial direction of the heating roller 21.

When the air is supplied in a slanting direction, it becomes easier for the air to flow into the multiple heating rollers 21 compared with cases in which the air is supplied in a direction orthogonal to the axial direction of the multiple heating rollers 21. In order to handle such a situation, in the present embodiment described with reference to FIG. 8, the partition 48 is arranged between the space inside the pair of end holders 45 in which the multiple sealing portions 31*a* are arranged and the space inside the multiple light-emitting tubes 31 in each of which a heating element is arranged. Such a heating element of each one of the light-emitting tubes is made of filament coils of the halogen heater 25. As the partition 48 is arranged between the space inside each one of the pair of end holders 45 and the space inside the heating roller 21, the air can be prevented from flowing into the multiple heating rollers 21, and falls in temperatures on the multiple heating rollers 21 can be avoided.

The drying device 20 according to the present embodiment may include a plurality of drying devices of different types, and such drying devices of different types may be arranged upstream from or downstream from any one of the multiple heating rollers 21 in the sheet conveyance direction. The sheet may be dried using a plurality of drying methods. Such drying devices of different types include, for example, drying means such as a blower that involves air blowing or ventilation, in addition to a non-contact drying device and heating means such as an infrared (IR) light irradiation device or an ultraviolet (UV) light irradiation device that involve optical energy to dry ink droplets. The non-contact drying means is used to dry the surface onto which liquid is to be applied or the rear side of the surface onto which liquid is to be applied. The air may be supplied to, for example, the drying device of those different types, the heating apparatus of those different types and portions to be heated around sensors or devices, using the air supply device 50 according to the embodiments of the present disclosure.

The embodiments of the present disclosure may be applied not only to a drying device with a temperature sensor but also to a drying device without a temperature sensor. Accordingly, the air supply device 50 according to the embodiments of the present disclosure may be applied not only to a case or configuration where the air is supplied to both the end holders 45 and the temperature sensor unit 40, but may be applied to a case or configuration where the air is supplied only to the end holders 45.

By way of example, the drying device 20 provided for the image forming apparatus 100 that adopts inkjet printing is described as the heating apparatus according to the embodiments of the present disclosure. However, no limitation is intended thereby, and the embodiments of the present disclosure may be applied to a heating apparatus that heats an object to be heated such as a sheet for the purposes of something other than drying. For example, the embodiments of the present disclosure may be applied to a heating apparatus provided for image forming apparatuses that adopt electrophotography to form an image using toner.

The image forming apparatus 100 according to the present embodiment that adopts inkjet printing also serves as an example of a liquid discharge apparatus to which the embodiments of the present disclosure are applied. Such a liquid discharge apparatus is provided with a plurality of liquid discharge devices, and drives those liquid discharge devices to discharge liquid onto a sheet.

The liquid discharge apparatus to which the embodiments of the present disclosure are applied includes, for example, a unit used to feed, convey, or eject a sheet, a pretreatment device, and a post-processing apparatus such as a sheet processing apparatus.

In the liquid discharge apparatus, the multiple liquid discharge devices may move relative to the sheet, or the multiple liquid discharge devices may not move relative to the sheet. Concrete examples of the liquid discharge apparatus include, for example, a serial device in which the multiple liquid discharge heads such as the liquid discharge devices are moved and a line device in which the multiple liquid discharge heads such as the liquid discharge devices are not moved.

The liquid discharge apparatus according to the embodiments of the present disclosure is not limited to an apparatus that uses discharged liquid to visualize an image such as a character and a figure. For example, the liquid discharge apparatus according to the embodiments of the present disclosure includes an apparatus that forms patterns or the like having no meaning in itself, and an apparatus that forms a three dimensional image. Alternatively, the liquid discharge apparatus according to the embodiments of the present disclosure includes, for example, a treatment-liquid discharge apparatus that discharges treatment liquid onto the surface of a sheet for the purposes of, for example, reforming the surface of the sheet.

The sheet according to the above embodiments of the present disclosure is an object to which liquid can at least temporarily adhere, and includes, for example, a sheet to which liquid adheres and is fixed and a sheet to which liquid adheres and permeates. Concrete examples of the sheet include a recording medium such as a sheet of paper, a recording sheet, a film, and cloth, and an electronic substrate.

The material of the sheet may be, for example, paper, thread, fiber, cloth, leather, metal, plastic, glass, wood, and ceramic, and is satisfactory as long as liquid can adhere thereto even on a temporary basis.

The liquid that is discharged by the liquid discharge apparatus is satisfactory as long as it has viscosity or surface tension and it can be discharged from the liquid discharge device, and no limitation is indicated thereby. It is desired that such liquid has viscosity of equal to or less than 30 millipascal-second (mPa-s) at normal temperature and under normal atmospheric pressure. Alternatively, it is desired that such liquid has viscosity of equal to or less than 30 millipascal-second (mPa-s) as a result of heating or cooling. More specifically, the liquid that is discharged by the liquid discharge apparatus may be solutions, suspensions, and emulsions including, for example, solvents such as water and organic solvents, colorants such as dyes and pigments, high-performance materials or functional materials such as polymerized compounds, resins, and surfactants, biomaterials such as deoxyribonucleic acid (DNA), amino acids, proteins, and calcium, and edible ingredients such as natural pigments. For example, these several kinds of liquid may be used for ink used for inkjet printing, surface treatment liquid, an electronic element, components or elements of a light-emitting element, liquid used to form resist patterns of an electronic circuit, and material liquid used to form a three-dimensional object.

Some aspects of the above embodiments of the present disclosure that relate to a heating apparatus, an image forming apparatus, and a liquid discharge apparatus are given below.

First Aspect

A heating apparatus includes a heating roller having a heat source inside, an end holder in which a portion of the heat source is disposed, the end holder holding an axial end of the heating roller rotatably, and an air supply device to supply air into the end holder in a direction intersecting with an axial direction of the heating roller.

Second Aspect

In the heating apparatus according to the first aspect, the heating source includes a light-emitting tube having a sealing portion at an end to seal gas filled inside, and the sealing portion is disposed inside the end holder.

Third Aspect

In the heating apparatus according to the second aspect, the end holder has an air inlet opening to supply air inside the end holder and an air outlet opening to discharge the air outside the end holder, and the air inlet opening and the air outlet opening are disposed to face each other across the sealing portion in a direction intersecting with an axial direction of the heating roller.

Fourth Aspect

In the heating apparatus according to the third aspect, the air outlet opening is wider than the air inlet opening.

Fifth Aspect

The heating apparatus according to any one of the first aspect to the fourth aspect further includes a temperature sensor unit having a temperature sensor inside to detect a temperature of the heating roller, and the air supply device supplies air to both inside of the end holder and inside of the temperature sensor unit in the heating apparatus according to any one of the first aspect to the fourth aspect.

Sixth Aspect

The heating apparatus according to the fifth aspect further includes an airflow-rate changer to change a volume of air to be supplied from the air supply device to both inside of the end holder and inside of the temperature sensor unit.

Seventh Aspect

In the heating apparatus according to sixth aspect, the air supply device includes a blower to blow air to both inside of the end holder and inside of the temperature sensor unit and an air-supply path branched from the blower to guide air to both inside of the end holder and inside of the temperature sensor unit, and the airflow-rate changer has an air adjustment valve to change an opened area of the air-supply path through which air is guided to the end holder and an opened area of the air-supply path through which air is guided to the temperature sensor unit.

Eighth Aspect

The heating apparatus according to the second aspect further includes a partition between space inside the end holder in which the sealing portion is disposed and space inside the heating roller in which a heating element of the heat source is disposed.

Ninth Aspect

A heating apparatus includes a heating roller having a heat source inside, and an end holder in which a portion of the heat source is disposed, the end holder rotatably holding an axial end of the heating roller. In the heating apparatus according to the ninth aspect, the end holder has an air inlet opening through which air is supplied into the end holder and an air outlet opening through which air is ejected outside from inside the end holder, and the air inlet opening and the air outlet opening are disposed in a direction intersecting with an axial direction of the heating roller with respect to the heat source.

Tenth Aspect

An image forming apparatus includes an image forming device to form an image on a sheet, and the heating apparatus according to any one of the first aspect to the ninth aspect that heats the sheet.

Eleventh Aspect

A liquid discharge apparatus includes a liquid discharge device that discharges liquid onto a sheet, and the heating apparatus according to any one of the first aspect to the ninth aspect that heats the sheet.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. A heating apparatus comprising:

a heating roller having a heat source inside;

an end holder in which a portion of the heat source is disposed, the end holder holding an axial end of the heating roller rotatably;

a temperature sensor unit having a temperature sensor inside to detect a temperature of the heating roller; and an air supply device configured to supply air to both inside of the end holder and inside of the temperature sensor unit, wherein the air supply device supplies air into the end holder in a direction intersecting with an axial direction of the heating roller.

2. The heating apparatus according to claim 1, wherein the heating source includes a light-emitting tube having a sealing portion at an end to seal gas filled inside, and wherein the sealing portion is disposed inside the end holder.

3. The heating apparatus according to claim 2, wherein the end holder has an air inlet opening to supply air inside the end holder and an air outlet opening to discharge the air outside the end holder, and wherein the air inlet opening and the air outlet opening are disposed to face each other across the sealing portion in a direction intersecting with an axial direction of the heating roller.

4. The heating apparatus according to claim 3, wherein the air outlet opening is wider than the air inlet opening.

5. The heating apparatus according to claim 2, further comprising a partition between space inside the end holder in which the sealing portion is disposed and space inside the heating roller in which a heating element of the heat source is disposed.

6. The heating apparatus according to claim 1, further comprising an airflow-rate changer configured to change a volume of air to be supplied from the air supply device to both inside of the end holder and inside of the temperature sensor unit.

7. The heating apparatus according to claim 6, wherein the air supply device includes a blower configured to blow air to both inside of the end holder and inside of the temperature sensor unit and an air-supply path branched from the blower to guide air to both inside of the end holder and inside of the temperature sensor unit, and wherein the airflow-rate changer has an air adjustment valve configured to change an opened area of the air-supply path through which air is guided to the end holder and an opened area of the air-supply path through which air is guided to the temperature sensor unit.

8. A liquid discharge apparatus comprising:

a liquid discharge device configured to discharge liquid onto a sheet; and the heating apparatus according to claim 1 configured to heat the sheet.

9. A heating apparatus comprising:

a heating roller having a heat source inside; and an end holder in which a portion of the heat source is disposed, the end holder rotatably holding an axial end of the heating roller; and a temperature sensor unit having a temperature sensor inside to detect a temperature of the heating roller, air is supplied to inside the temperature unit, and wherein the end holder has an air inlet opening through which air is supplied into the end holder and an air outlet opening through which air is ejected outside from inside the end holder, wherein the air inlet opening and the air outlet opening are disposed in a direction intersecting with an axial direction of the heating roller with respect to the heat source.

10. An image forming apparatus comprising:

an image forming device configured to form an image on a sheet; and a heating apparatus configured to heat the sheet, the heating apparatus including a heating roller having a heat source inside, an end holder in which a portion of the heat source is disposed, the end holder holding an axial end of the heating roller rotatably, a temperature sensor unit having a temperature sensor inside to detect a temperature of the heating roller, and an air supply device configured to supply air to both inside of the end holder and inside of the temperature sensor unit, wherein the air supply device supplies air into the end holder in a direction intersecting with an axial direction of the heating roller.

* * * * *